United States Patent [19]

Oosterkamp

[11] Patent Number: 5,100,609
[45] Date of Patent: Mar. 31, 1992

[54] ENHANCING LOAD-FOLLOWING AND/OR SPECTRAL SHIFT CAPABILITY IN SINGLE-SPARGER NATURAL CIRCULATION BOILING WATER REACTORS

[75] Inventor: Willem J. Oosterkamp, Los Gatos, Calif.

[73] Assignee: General Electric Company, San Jose, Calif.

[21] Appl. No.: 615,098

[22] Filed: Nov. 19, 1990

[51] Int. Cl.$^5$ .................................. G21C 7/32
[52] U.S. Cl. .................... 376/210; 376/373; 376/377; 376/209
[58] Field of Search ............... 376/370, 371, 373, 374, 376/375, 210, 211, 241, 377, 379, 209

[56] References Cited

U.S. PATENT DOCUMENTS

| | | | |
|---|---|---|---|
| 3,429,775 | 6/1966 | Petersen | 376/372 |
| 3,621,926 | 11/1971 | Townsend | 376/372 |
| 4,557,890 | 12/1985 | Matsuda et al. | 376/282 |
| 4,877,574 | 10/1989 | Suzuki et al. | 376/210 |

FOREIGN PATENT DOCUMENTS

| | | | |
|---|---|---|---|
| 3330040 | 3/1985 | Fed. Rep. of Germany | 376/210 |
| 1102394 | 4/1989 | Japan | 376/210 |

Primary Examiner—Brooks H. Hunt
Assistant Examiner—Frederick H. Vost
Attorney, Agent, or Firm—Robert R. Schroeder

[57] ABSTRACT

The present invention discloses an improved methodology for achieving the desirable feature of recirculation flow control in a sparger-type natural-circulation BWR, enabling reactors utilzing the method to perform in load-following and/or spectral shift modes of power operations. In its broadest aspects, the invention is based on locating the feedwater sparger at an elevational level which is about water level established during normal operation of the BWR. One or more of load following or spectral shift can be performed by controlling the feedwater fed to said BWR through the feedwater inlet and into the sparger to vary the water level to be above, at or below the elevational level of such sparger.

3 Claims, 1 Drawing Sheet

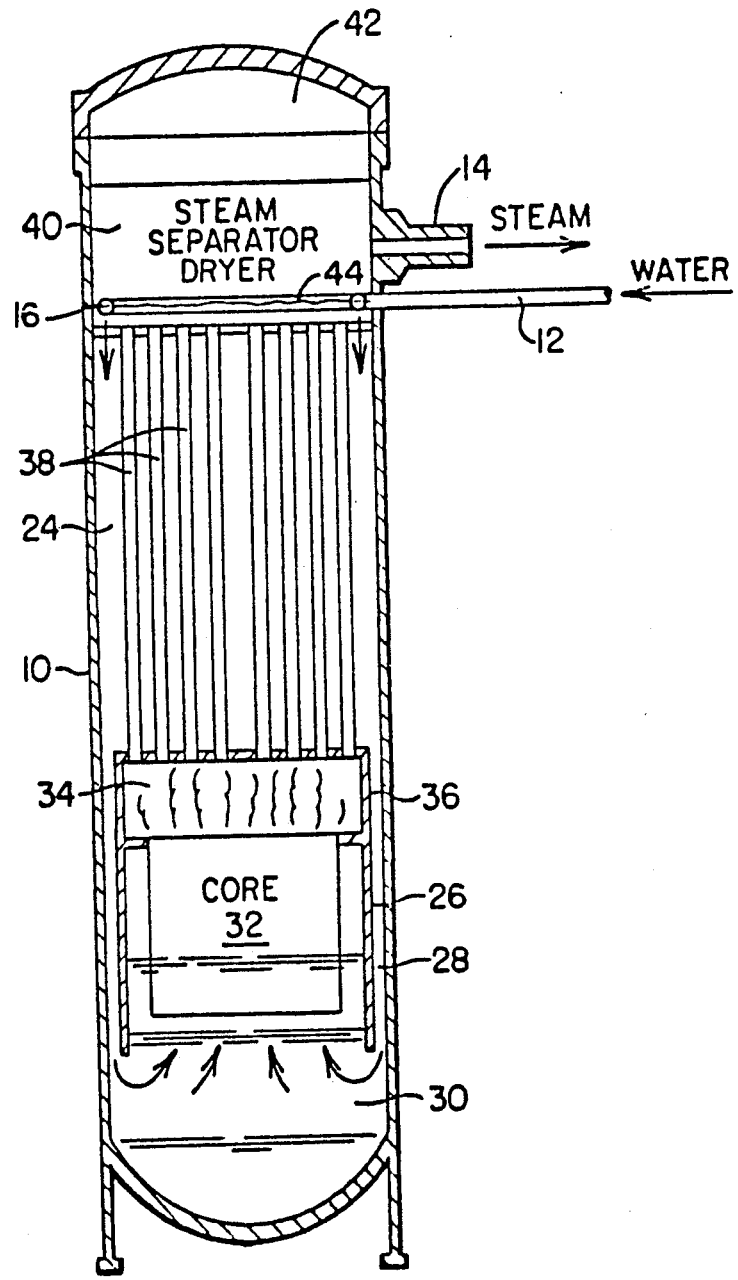

ENHANCING LOAD-FOLLOWING AND/OR SPECTRAL SHIFT CAPABILITY IN SINGLE-SPARGER NATURAL CIRCULATION BOILING WATER REACTORS

BACKGROUND OF THE INVENTION

The present invention relates to nuclear boiling water reactors (BWRs) that utilize natural circulation and more particularly to enabling load-following capability and/or enhancing spectral shift in such reactor designs.

Existing large BWRs are of the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of the core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors as the power output from the fuel bundles, the amount of sub-cooling present in the coolant entering the fuel bundle, and the amount of flow through the bundles. This last factor depends on the power of the recirculation pumps and the hydrodynamic flow resistance presented by the fuel bundle geometry and wetted surfaces, and the amount of orificing representing restrictions to flow just prior to the coolant's entrance into the core fuel assembly.

Joining with the core effluent in the core upper plenum is the core "by-pass" flow, which is reactor coolant that has flowed from the core lower (entrance) plenum into the region external to the fuel assembly channels (but inside the core shroud), thence upwardly generally through the region occupied by cruciform-shaped control blades which stand in various degrees of insertion into the core, thence across the upper grid member (called the "top guide") which with its lattice-like configuration keeps the fuel assemblies in a regular array, and finally into the core upper plenum. This by-pass coolant stream at its discharge into the core upper plenum is compromised substantially of saturated liquid, with perhaps a small amount of steam. Within the core upper plenum, these two effluents-by-pass flow and fuel bundle exit flow-rapidly mix together and quickly lose identity from their origins.

Mechanical steam separation can be utilized to accomplish the separation of the steam from the steam/water mixture exiting the core. Some earlier BWR designs used free-surface steam separation where, just as in the household tea kettle, steam separates unaided from the free-surface, and saturated water remains in the bulk coolant, which in BWRs is recirculated back down the downcomer annulus. This type of steam separation is feasible so long as the steam-leaving velocity, i.e. the bulk average velocity of the steam taken across the available pathway flow area, is not large, i.e. is no greater than about 1.8 foot/second. If steam-leaving velocities exceed this value, there tends to be carried along with the steam an unacceptably high moisture content. The high moisture levels saturate the moisture-drying abilities of the steam dryer, thus resulting in an unacceptably high moisture content in the steam leaving the reactor and supplied to the turbine. When steam moisture contents are too high in the turbine steam flow, accelerated erosion can occur on first-stage turbine blades and the efficiency of the turbine is reduced.

It is possible to obtain free-surface separation capabilities if the reactor pressure vessel (RPV) cross-sectional area is made sufficiently large. However, cost economies dictate that minimum diameter RPVs be used, so that mechanical steam separation has been developed to handle the high power output steam production levels of modern BWRs. In these latter designs, the steam bulk average velocity moving through the wet steam plenum region immediately downstream of the mechanical steam separators is about 5 feet/second.

The fuel assemblies grouped over the central region of the core tend to have higher exit steam qualities than do bundles located at the peripheral region of the core. It is desirable, nonetheless, that the flow rates and steam/water mixture proportions entering the steam separator standpipes be relatively uniform. To facilitate gaining more nearly uniform steam/water mixture for entry into the standpipes, the standpipe entrances are separated from the fuel assemblies by a distance of, for example, about 5 feet. Turbulent mixing occurring between the plumes leaving adjacent fuel assemblies, each with a different void content, is one mechanism acting to produce a more nearly uniform mixture which enters into the steam separator standpipes. More important to achieving flow mixture uniformity, however, is the hydrodynamic flow resistance represented by the standpipes, each with their end-mounted steam separators. Complete flow mixture uniformity entering the standpipes is at best difficult to achieve and, even with a five-foot separation between fuel assembly exits and standpipe entrances, it is not a design basis used for reactor performance evaluations.

The steam separator assembly consists of a domed or flat-head base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to the downcomer annulus region which lies at the inboard periphery to the RPV. A second purpose for the standpipes is a high-power-output natural-circulation reactor using mechanical steam separators is to provide juxtaposed regions which promote natural-circulation by means of a vertical region of two-phase (and, thus, low-density) coolant inside the standpipes which is juxtaposed against single-phase liquid coolant outside the standpipes in a so-called "downcomer region", in which region height provides a very significant part of the total natural circulation driving head for coolant flow circulation within the reactor.

The steam separator assembly rests on the top flange of the core shroud and forms the cover of the core discharge plenum ("core upper plenum") region. The seal between the separator assembly and core shroud flange is a metal-to-metal contact and does not require a gasket or other replacement sealing devices. The fixed axial flow type steam separators have no moving parts and are made of stainless steel, for example, to resist corrosion and erosion.

In each separator, the steam/water mixture rising through the standpipes (the "standpipe region") impinges upon vanes which give the mixture a spin, thus enabling a vortex wherein the centrifugal forces separate the water from the steam in each of three stages. Steam leaves the separator at the top of this assembly and passes into the wet steam plenum below the dryer. The separated water exits from the lower end of each stage of the separator and enters the pool (the "downcomer region") that surrounds the standpipes to join the downcomer flow. The steam exiting from all separators either may be in the same horizontal plane, or the separators may be arranged in a slightly crowned fashion at the center to compensate for the crowned water gradient of the pool surrounding the standpipes.

The steam separator assembly may be bolted to the core shroud flange by long hold-down bolts, or the separator together with the dryer assembly may be held down onto the core shroud flange by contact from the reactor head when the latter is assembled to the reactor vessel. The nominal volumetric envelope of the steam separator assembly is defined by the horizontal plane of its lower flange that contacts the core shroud flange, its cylindrical sides that provide part of the five-foot stand-off from the fuel assembly exits, the circumscribed diameter of the outermost row of standpipes, the circumscribed diameter of the outermost row of steam separators, and the generally horizontal plane of the exits to the steam separators.

The core upper plenum region in a BWR currently under design known as the "simplified boiling water reactor" (SBWR) is substantially devoid of other mechanical devices, pipes, or structures; whereas the core upper plenum of a BWR/6 and "advanced boiling water reactor" (ABWR) reactor design generally contains spargers and nozzles for core sprays, and distribution headers for core flooders, respectively. In both reactor types, these spargers/headers are located at the outer periphery of the core upper plenum, mounted below the core shroud flange so that the sparger/header is clear of the refueling removal path of peripheral fuel assemblies and, thus, do not become removed during core refueling operations.

With specific reference to a natural-circulation SBWR, it will be observed that there are no recirculation pumps to aid in coolant recirculation. Steam generation in the core produces a mixture of steam and water which, because of steam voids, is less dense than saturated or sub-cooled water. Thus, the boiling action in the core results in buoyancy forces which induce core coolant to rise upwardly, to be continuously replaced by non-voided coolant arriving from beneath the core in the core lower plenum region. As the coolant leaves the core, it rises through the core upper plenum region, then through the standpipes region, and finally into the steam separators. This voided mixture inside these standpipes continues to be less dense than non-voided coolant external to the standpipes, resulting in the development of additional buoyancy force to further drive the coolant circulation. That this process is quite effective in promoting coolant recirculation can be noted from reported tests made in forced-circulation power reactors where the coolant circulation pumps are shut off. Even with their relatively short steam separator standpipes, reactor power levels of 25% and coolant flow rates of 35% of rated flow, are readily and safely maintainable.

The SBWR reactor is but modestly different from the forced-circulation BWR, with the most prominent differences being that the standpipes region is to be considerably longer in the SBWR (to develop a higher differential head), the core overall height may be somewhat shorter (for example, being 8 or 9 feet active fuel length versus 12.5 feet active fuel length in recent forced-circulation reactors), and the core power density will be somewhat lower. The severity of orificing—a means to promote hydrodynamic stability—at the entrance to the BWR fuel bundles may be lessened. The fuel bundle may have a larger diameter fuel rod in, for example, a $6 \times 6$ rod array, whereas the rod array for a forced-circulation reactor often is an $8 \times 8$ rod array. The design flow rates per fuel bundle, and the flow rates per steam separator, will be somewhat reduced in the SBWR design. Fuel exit steam quality will be approximately the same between the two designs. In the SBWR reactor design, no spargers or discharge headers are installed in the core upper plenum, while in the ABWR reactor, spargers or discharge headers are installed in the upper core plenum.

In some versions of SBWR reactors under study, the standpipes are very long while the core upper plenum is short. In other versions, the converse is true. The present invention is applicable equally in either version.

"Load-following" is the action of bringing the power output of a BWR into balance with an incrementally changed power output demand. This demand change arises from the electrical grid to which the nuclear power station is coupled and represents a change from prior steady-state (balanced) operating conditions.

By way of illustration, assume that an SBWR is operating at 90% of rated power output. Existing within the core will be some certain distribution of voids, i.e. steam vapor in the form of steam bubbles. The lowermost parts of the fuel assemblies will contain nonvoided coolant because of the sub-cooled liquid conditions existing in the core lower plenum, the source for water entering the core. Partway up the flow path within the fuel assemblies, steam generation begins, so that a steam/liquid mixture develops with the steam proportion rising with increasing travel upward through the fuel assembly. Control blades immediately outside the fuel assembly channels will stand in various degrees of withdrawal from the core depending on the particular point the core has reached in its fuel cycle lifetime.

The steam output from the nuclear boiler is coupled to a turbine generator which, in turn, is coupled electrically to the grid. A nuclear boiler pressure regulation control system is installed, the action of which changes the position of turbine steam control valves in such a way so as to maintain constant the nuclear boiler pressure as measured in the reactor steam dome.

A change in grid electrical demand—say an incrementally increased demand for more electrical power from the power station—causes a signal to be sent to a control rod positioning system that results in incremental withdrawal of certain of the control blades still not fully withdrawn from the core. This withdrawal has the effect of making the reactor temporarily more reactive, allowing an increase in neutron flux, that, in turn, produces a higher rate of nuclear fission throughout the fuel rods. The thermal capacitance represented by the mass of the fuel material (uranium dioxide) briefly, i.e. for a few seconds, absorbs the thermal energy produced throughout the fuel rods as their internal temperature rises. (The fuel heat transfer thus lags the neutron flux, the transient response characteristic being that of, typically, a seven-second time constant). Soon, however, the higher temperatures lead to greater heat transfer from the now-higher fuel clad temperature to the reactor coolant, and so an incrementally higher amount of steam is formed. In addition, the point where boiling first begins within the fuel assembly moves slightly downward in response to the higher heat transfer that is occurring. This combination of incrementally more voids in prior boiling regions, plus downward movement of the boiling boundary, now introduce negative reactivity effects that returns the reactor to a balanced, steady-state, power level, but one that is generating incrementally more steam. In response to the larger steam generation rate, to hold pressure constant in the reactor steam dome (as the control system mandates), the pressure regulation system progressively incrementally opens the turbine control valves, thus releasing a net greater quantity of steam to the turbine. Higher steam rates passing through the turbine produce the required incremental increase in ultimate response to the initiating electrical grid demand for more electrical power from the station.

The principles described above can be extended to those conversant with nuclear engineering practice to understand other types of power adjustments. It will be apparent that the foregoing illustration is the response to a small increase in load demand. Obviously, the adjustment of reactor power output also can be performed manually by the reactor operator, through his actions to cause control blades to be inserted farther into the core or withdrawn farther outward from the core.

Often, a nuclear power station is required to sustain larger load demand adjustments than the relatively small adjustment described above. Existing nuclear power stations are deficient in that it takes time to retract the control blades. Even when the control blades are moved in groups ("ganged rod movement"), it still requires time for the groups to be sequentially moved. An additional disadvantage to load-following by control blade movement can be that the heating transients within the fuel occurring close to the ends of where the control blades are positioned, over time can produce undesirable stress-cycling on fuel cladding.

An alternative load regulation means that has been found effective for forced-circulation BWRs is to use recirculation flow control. A signalled change in reactor power demand is sent to a control system that adjusts to recirculation flow upward or downward. The recirculation flow is regulated either by changing the speed of the main recirculation pumps, or in other applications by throttling the output; from constant-speed pumps by means of a flow-control valve. The changed flow causes a rather prompt change in the amount of voids in the core and a similar change in the position of the boiling boundary within the fuel assemblies within the core. For example, the action response in the recirculation flow control system to an incremental demand for more reactor output would be to raise the rate of recirculation flow. This sweeps some existing voids out of the core, and raises the position of the boiling boundary. In turn, neutron flux rises, fission rate increases, and shortly a higher total amount of steam is being regenerated. With the reappearance of "near-normal" levels of voids in the core in response to the higher power output, the reactor condition returns to a "steady-state", but now at a higher output level. The two advantages of recirculation flow control are the rates of change in reactor core power can be faster; and since control blades are not required to be moved, no additional significant stress-cycling duty is imposed on the fuel rods.

To date, however, natural-circulation reactors have had only control rod movement available to them as a load-following means. As described earlier, a drawback with this mode of load-following control, i.e. performing load-following by moving control blades, is that it can be a slow-acting system because there are so many blades which just be moved some variable small amounts to effect a change while keeping the neutron flux profiles in desirable patterns. Thus, for various modes of power operation, it would be desirable for there to be other methods of more rapidly, yet controllably, affecting reactor power output, and thereby provide enhanced capability to perform a wider envelope of load-following maneuvers.

Another operation that can be accomplished in forced-circulation type BWRs is known as "spectral shift". "Spectral shift" of neutrons is a shift in the energy level of neutrons in the reactor core that enables a non-fissile material to be transmuted into a fissile material. A typical enhancement involves the transmutation of $^{238}U$ to $^{239}Pu$. Those skilled in the art already are aware of the fact that most sources of mined uranium are subjected to a variety of operations including concentration, conversion, and enrichment, in order to supply fissile material that is provided in the form of fuel elements for use in forming fuel rods for use in nuclear power plants, for example. Depending upon the process utilized and the type of reactor involved, cost and/or technological considerations result in a defined amount of non-fissile material yet being present in the nuclear fuel. By transmuting the non-fissile fraction of the fuel to a fissile form, the nuclear reactor can be operated for a longer period of time without refueling and/or before fewer fresh fuel bundles need to be installed. Thus, spectral shift can be a desirable mode of operation for various reactors. In forced circulation BWRs, spectral shift is achieved by reducing the recirculation rate which causes an increase in the void fraction in the core. Power level is reduced thereby. Accordingly, control rods are withdrawn to re-establish the reactor power level desired. When the void fraction is higher, the neutron spectrum shifts to a higher energy level, thus causing the non-fissile material to be transmuted to fissile form. Since natural-circulation reactors operate without forced water circulation, other techniques need to be developed in order to operate the reactors in a spectral shift mode.

BROAD STATEMENT OF THE INVENTION

The present invention discloses an improved methodology for achieving the desirable feature of recirculation flow control in a sparger-type natural-circulation or forced circulation BWR, enabling reactors utilizing the method to perform in load-following and/or spectral shift modes of power operations. Accordingly, the present invention is directed to a natural-circulation and forced circulation nuclear boiling water reactor of the type wherein a reactor pressure vessel (RPV) contains a lower water inlet and upper steam outlet connected to an upper steam dome. Housed within the RPV is a nuclear core disposed within a shroud which with the RPV defines an annulus region which is in flow communication with a core lower plenum region disposed beneath the nuclear core. A core upper plenum formed within the head of the shroud is disposed atop the nuclear core. The sparger is located above the core upper plenum. The BWR may be of the type utilizing natural steam/water separation wherein steam separates unaided from the free-surface of the water housed within the chimney of the RPV. Alternatively, the BWR may be of the type wherein a plurality of vertically-mounted standpipes are mounted atop the shroud head (and comprising the chimney) and in fluid communication with the core upper plenum and the upper steam dome. A steam separator/dryer assembly optionally may be mounted atop the standpipes and in fluid communication with the standpipes and with the chimney. The chimney is in fluid communication with the downcomer region located outside of the chimney (e.g. standpipes) to complete the water flow path. A water level is established within the BWR under normal (a defined power output level) operation of the BWR.

The improvement comprises the RPV feedwater inlet being connected to a sparger that is located about the interior circumference of the RPV. The sparger is located at an elevation at about the liquid water level established during normal operation of the BWR. This elevational location of the feedwater sparger enables one or more of load following or spectral shift to be performed by controlling the feedwater fed to the BWR through the feedwater inlet and into the sparger to vary the water level to be above, at, or below the elevational location of the sparger. Varying the feedwater fed to the BWR, and consequently raising or reducing the water level, reduces or increases the amount of steam that is condensed and increases or reduces the amount of sub-cooling and, consequently, the reactor power.

Alternative configurations of common reactor internals with modifications and/or additional components are described as illustrations of the application of the invention to reactor design.

Advantages of the present invention include a new means for providing load-following capability for sparger-type natural-circulation BWRs. A further advantage of the present invention is a new means for enhancing spectral shift capability for sparger-type natural-circulation BWRs. Yet a further advantage of the present invention includes a reactor design that is capable of being operated in a load-following mode, a spectral shift mode, or a combination of these modes. Another advantage of the present invention is the ability to provide adjustable regulation of the feedwater to the reactor to effect coolant recirculation flow rate. These and other advantages will be readily apparent to those skilled in the art based upon the disclosure contained herein.

BRIEF DESCRIPTION OF THE DRAWING

The drawing is a simplified cross-sectional elevational view of a sparger-type natural-circulation BWR showing a practical configuration for implementing the invention. The drawing will be described in detail below.

DETAILED DESCRIPTION OF THE INVENTION

Since a natural-circulation BWR contains no recirculating devices nor external loops, regulating the speed of the prime drive motor so as to produce a controlled recirculation flow rate or throttling flow control valves located in external recirculation loops to obtain flow rate regulation are unavailable. Accordingly, the problem to be solved is to devise an improved means of obtaining effective load-following capability and/or enhancing spectral shift capability in sparger-type BWRs and for which the drawbacks in the form of added components are minimal and are acceptable considering the benefits obtained. With reference to the drawing, it will be appreciated that much of the reactor internals are conventional and have been omitted from the drawings as such components are unnecessary to the modifications which need to be made to the BWRs in accordance with the precepts of the present invention. The reactor internals, their construction, and operation are well known in the art, such as illustrated by reference to the following publications: Glasstone and Sesonke, *Nuclear Reactor Engineering*, pp 748-753, 3d Edition, VanNostrand. Reinholt (New York, NY, 1981); Wolfe and Wilkens, "Improvements in Boiling Water Reactor Designs and Safety", presented at American Nuclear Society Topical Meeting, Seattle, Wash., May 1-5, 1988; Duncan and McCandless, "An Advanced Simplified Boiling Water Reactor", presented at the American Nuclear Society Topical Meeting, Seattle, Wash., May 1-5, 1988; and Lahey and Moody, *The Thermal Hydraulics of a Boiling Water Reactor*, especially Chapter 2, pp 15-44, American Nuclear Society (LeGrange Park, Ill., 1977). Conventional BWRs, the ABWR, and the SBWR, all are described and discussed in the foregoing references, all of which are expressly incorporated herein by reference. While the description refers primarily to natural circulation BWRs, forced circulation reactors can be modified in accordance with the present invention also.

Referring to FIG. 1 more particularly, reactor pressure vessel (RPV) 10 is seen to admit feedwater via inlet 12 and exhaust steam via outlet 14. Connected to inlet 12 is sparger 16. Sparger 16 is a ringshaped pipe having suitable apertures through which the feedwater is passed to within RPV 10. The design of spargers and their apertures is conventional and well-known to those skilled in the art.

As described generally above and in particular in the references cited, with respect to the flow path of water within RPV 10, sub-cooled water located in the downcomer region identified at 24 flows downwardly between RPV 10 and shroud 26 in the annulus region identified at 28. The water flowing through annulus 28 then flows to the core lower plenum region identified at 30. Again, for simplicity many of the reactor internal components have not been illustrated in the drawing as these items are conventional and will be readily apparent to those skilled in the art.

The water then flows through a guide tube region located within shroud 26 and below core 32, thence through the fuel orifices and past the fuel support casting and nosepiece lower tie plates. The water then enters the fuel assemblies disposed within core 32 wherein a boiling boundary layer is established, thus causing a lower non-boiling region and an upper boiling region within the fuel assemblies. Flow by-passing is to be provided as is necessary, desirable, or convenient in conventional fashion.

Next, a mixture of water and steam enters core upper plenum 34 which is formed within shroud head 36 and disposed atop core 32. Core upper plenum 34 provides stand-off between the mixture exiting core 32 and entering standpipes 38 that are disposed atop shroud head 36 and in fluid communication with core upper plenum 34.

It will be observed that downcomer region 24 is formed between the walls of RPF 10 and standpipes 38 which form the chimney. It will be appreciated that a variety of additional confining or direction means/members could be used as the chimney in place of standpipes 38.

The liquid water elevation or level established within RPV 10 during normal operation of the BWR is identified at 44. Normal operation is defined to be a reactor output at expected or normal grid electrical demand with all components of the reactor operating nominally. Note that sparger 16 is located at about water elevation or level 44. Sparger 16 is located above the skirt bottom of the separator.

The mixture flowing through standpipes 38 then enters steam separator/dryer assembly 40 that is to be provided in conventional or unconventinoal fashion. Separator 40 provides outlet communication for separated water to enter downcomer 24 and for steam to enter steam dome 42 and thence to be withdrawn from RPV 10 via outlet 14. The separated water in downcomer 24 and recycled feedwater from the turbine island portion of the power generating station entering inlet 12, then combine and the flow circulation commences again.

From the foregoing description, it will be readily apparent that steam will condense if water level 44 is lower than the elevation of sparger 16 and there will be little or no sub-cooling. If water level 44 is raised to an elevation above sparger 16, there is less time for condensation and the sub-cooling will increase. The upward flow at the indicated sparger elevational level reduces with higher water levels and becomes is virtually zero at a suitably high water level so there will be no entrainment of feedwater towards steam separator dryer 40. Load following, then, is performed simply by reducing or increasing the feedwater flow and, thus, the elevation of water level 44. Consequently, the amount of steam that is condensed will be increased or decreased and so will the amount of sub-cooling and, consequently, the reactor power.

Thus, it will be observed that the power level generated by the reactor can be increased or decreased by suitable operation of the sparger BWR disclosed herein. For spectral shift operation, it will be appreciated that the sparger BWR will be operated so as to reduce the sub-cooling and/or recirculation rate so as to increase the void fraction in the core and, thus, reduce the power level of the reactor. Withdrawal of the conventional control rods, not shown in the drawings, re-establishes the power level and enhances spectral shift operation of the reactor.

As noted above, when operating the sparger BWR of the present invention in a spectral shift mode, load following still is possible responsive to grid electrical demand and/or other demands made of the reactor. Spectral shift may be compromised and/or control rod movement may be required, yet load following is believed to be achievable primarily through judicious operation of feedwater admitted into the reactor via the sparger disposed therewithin.

As to the materials of construction, preferably all components are manufactured from materials appropriate for their use within a nuclear BWR. Further, it will be appreciated that various of the components shown described herein may be altered or varied in accordance with the conventional wisdom in the field and certainly are included within the present invention, provided that such variations do not materially vary within the spirit and precepts of the present invention as described herein.

I claim:

1. A method for obtaining load-following capability in a boiling water reactor (BWR) wherein housed within a reactor pressure vessel (RPV) is a nuclear core disposed within a shroud having a shroud head and which with said RPV defines an annulus region which is in flow communication with a core lower plenum region disposed beneath said nuclear core, an upper steam dome connected to a steam outlet in said RPV, a core upper plenum formed within said shroud head and disposed atop said nuclear core, a chimney mounted atop said shroud head and in fluid communication with said core upper plenum and with a steam separator having a skirt which is in fluid communication with said steam dome, the region outside of the chimney defining a downcomer region, there being a water level established therein under normal operation of said BWR, and said RPV containing a feedwater inlet, which comprises:

disposing a single sparger connected to said feedwater inlet above the steam separator skirt bottom about the interior circumference of said RPV at an elevation at approximately the water level established during normal operation of said BWR; and adjusting the feedwater flow through said inlet and into said sparger to vary the water level to be above, at, or below the elevational location of said sparger in response to load-following need.

2. The method of claim 1 wherein said BWR is a natural circulation BWR.

3. The method of claim 1 wherein said BWR is a forced circulation BWR.

* * * * *